March 11, 1941.  B. K. FORD  2,234,671
METHOD OF AND APPARATUS FOR PRODUCING AN INSULATED CORE
Filed June 28, 1938
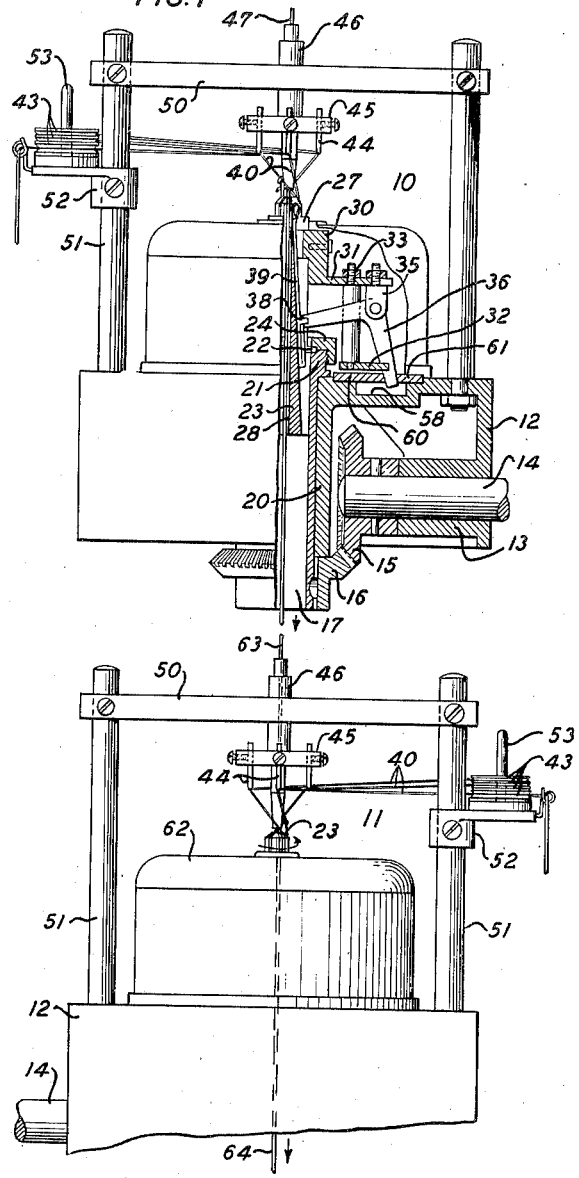
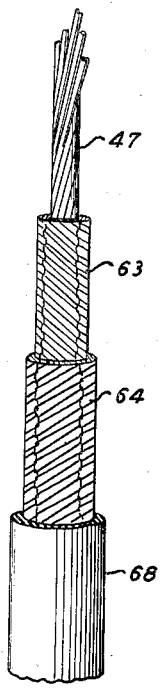
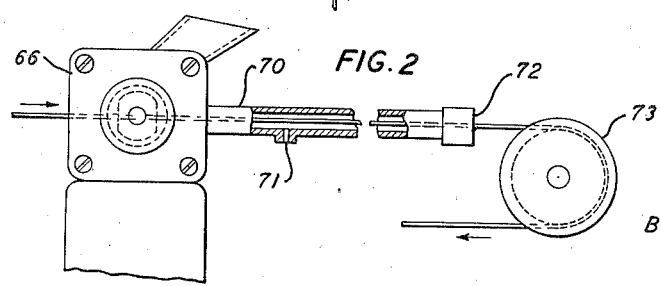
INVENTOR
B. K. FORD
BY
E. R. Nowlan
ATTORNEY

UNITED STATES PATENT OFFICE 2,234,671

METHOD OF AND APPARATUS FOR PRODUCING AN INSULATED CORE

Ben K. Ford, Westfield, N. J., assignor to Western Electric Company, Incorporated, New York, N. Y., a corporation of New York Application June 28, 1938, Serial No. 216,252

6 Claims. (Cl. 66—9)

This invention relates to a method of and apparatus for producing an insulated core.

In the art of manufacturing insulated electrical conductors, copper is frequently employed for the conductor and rubber is frequently employed to form an insulating sheath therefor. It has been considered important, however, that suitable materials be disposed between the conductors of copper and an insulating sheath of rubber to serve as a barrier between them to maintain the conductor clean.

Objects of the invention are to provide a simple, efficient and practical method of and apparatus for producing an insulated core.

With these and other objects in view the invention comprises a method of and apparatus for producing the insulation on a core wherein a plurality of knitted heads rotating in an opposite direction provide a double knitted barrier on a core travelling through the heads in sequence and applying a covering of plastic material over the barrier.

Other objects and advantages will appear in the following detailed description taken in conjunction with the accompanying drawing, wherein Fig. 1 is a front elevational view of a portion of the apparatus by means of which the method may be practised;

Fig. 2 is a diagrammatic view of an extrusion and vulcanizing mechanism, and

Fig. 3 is a fragmentary view of an insulated conductor produced by the method and apparatus.

In the present embodiment of the invention knitting heads of the type shown and described in detail in Patent No. 2,126,250, issued August 9, 1938, to Ben K. Ford, and indicated generally at 10 and 11, are disposed one above the other and are substantially identical in construction with the exception that the needle carrier of the former is rotated clockwise, looking from the top, while the needle carrier of the latter is rotated in the opposite direction. The knitting head 10 is shown in detail and description of the construction of this head is believed sufficient to establish a clear understanding of both knitting heads.

The knitting head 10 comprises a main housing or support 12 having an integral tubular bearing portion 13 to rotatably receive a drive shaft 14, the latter having mounted on the inner end thereof a bevelled gear 15 positioned to interengage a bevelled gear 16 keyed to the lower end of a needle carrier supporting sleeve 17. The supporting sleeve 17 serves as a shaft and is rotatably journalled in a vertically apertured portion 20 of housing 12, the upper portion of the sleeve having an outwardly extending portion 21 riding upon the upper surface of the housing. The portion 21 of the sleeve 17 has an annular groove in its upper edge to receive an annular flange 22 which is integral with a needle carrier 23, the latter extending downwardly into the sleeve 17, and is secured to the sleeve by means of a cap 24 threadedly connected to the portion 21.

The needle carrier 23 also extends upwardly from the flange 22 and has a plurality of longitudinally extending needle grooves or slots 27 positioned in equally spaced radial formation about a central aperture 28 which extends through the needle carrier. A collar 30 mounted upon the needle carrier 23 has an annular flange 31 integral therewith for supporting a lever guide 32 by means of bolts 33 or the like. The flange 31 also supports lever brackets 35, a desired number of which are disposed in spaced positions about the bracket depending upon the number of needles employed. A cam lever 36 is pivotally mounted upon each bracket 35 and has one arm thereof extending inwardly in general alignment with its respective groove 27, where it is pivotally connected as at 38 to its respective needle 39. The needles 39 are of the conventional latch type and are positioned to be reciprocated in their respective grooves to engage with their hooked ends certain of the strands 40 when starting their downward movement. The strands 40 are fed from suitable supplies (not shown) over selected sheaves or tension discs 43 to and through apertured ends of strand guides 44. The strand guides 44 are adjustably mounted in an annular supporting member 45, the latter being fixed to a tubular core guide 46 through which a core 47 is advanced to the knitting heads from suitable supply means (not shown). A cross bar 50, supported at its ends by uprights 51, the latter being mounted upon the housing 12, serves to support the tubular guide 46. A bracket 52 adjustably mounted upon one of the uprights 51, aided by pins 53, serves as means to rotatably support the tension discs 43.

The housing 12 has an annular groove 58 formed in its upper surface concentric with the sleeve 17. Rigidly mounted at the inner edge of the groove 58 is an inner cam 60 and mounted adjacent the outer edge of the groove is an outer cam 61. These cams, as shown in my aforementioned copending application, have their inner faces disposed substantially equal distances apart throughout their contour and define an endless cam slot in which the lower lever arms ride, causing actuation of the levers 36 to raise their respective needles at predetermined positions during rotation of the needle carrier and to lower the needles at predetermined intermediate positions.

A protective cover 62 is mounted upon the housing 12 and positioned to enclose most of the rotating and actuating parts of the knitting head to serve as a guard therefor.

The elements apparent in the knitting head 11 have the same reference numerals applied thereto as are applied to the similar parts of the knitting head 10 and the inner structures of the two knitting heads are the same with the exception that they are driven in opposite directions.

When the apparatus is in operation the shafts 14 of the knitting heads are rotated to impart a clockwise rotary motion to the needle carrier 23 and its associated parts, of the knitting head 10, and a counterclockwise rotary motion to the needle carrier 23 and its associated rotating parts of the knitting head 11. The core 47 travels downwardly through the guide 46 of knitting head 10 at the exit end of which it receives the knitted covering 63 and continues its travel with its first knitted covering through tubular guide 46 of the knitted head 11 at the exit end of which it receives the second knitted covering 64 and continues its travel through the central aperture of the needle carrier of this knitting head.

Referring more particularly to the knitting of the first covering on the core, it will be observed that rotation of the shaft 14 of the knitting head 10 will cause clockwise rotation of the sleeve 17, looking from the top, resulting in a clockwise rotation of the needle carrier 23. Rotation of the needle carrier causes a rotary movement of the needles 39 and their levers 36 therewith, resulting in a relative movement of the levers and the cams 60 and 61. The levers 36 during their rotary movements are rocked about their pivots in following the irregular contour of the cam surfaces to actuate the needles and cause the knitting of the covering 63 on the core. This knitted covering is applied so that the courses thereof will extend longitudinally of the core while the wales, consisting of interconnected loops of successive threads, extend spirally in one direction about the core.

The knitting units shown are of the type which form interconnected loops on the outside of the needle carriers, the loops while being formed extending in the direction of rotation of the needle carrier but when pulled over the top of the needle carrier and onto the core their positions are reversed and they extend spirally in a direction transverse to the direction of rotation of the needle carrier.

The action of the knitting head 11 is substantially the same as that of the knitting head 10, to apply the knitted covering 64 over the knitted covering 63, with the exception that the wales of the second knitted covering extend spirally about the core in a direction transverse to that of the wales in the first knitted covering.

After the covered core leaves the knitting head 11 it may be directed around a tension disc (not shown) to an extrusion head 66 of an extrusion mechanism adapted to extrude a uniform coating 68 of unvulcanized insulating material, such as rubber, thereon. The extrusion mechanism may be of any well known type (see Patent 1,689,205, October 30, 1928, to L. F. Lamplough) and is illustrated only diagrammatically since a complete description of its construction is not essential to completely understand the invention. It suffices to say that it is provided with a conveying screw which forces the insulating material under high pressure through a die around the covered core as it passes through the extrusion head. From the extrusion head 66 the covered core passes through a vulcanizing chamber 70 provided with an inlet 71 and an outlet 72 for conveying a heated non-oxidizing vulcanizing medium, such as steam, under pressure around the extruded covering. After the completed article of manufacture or insulated electrical conductor leaves the vulcanizing chamber 70 it passes over a sheave 73 to a take-up reel (not shown).

In the present embodiment of the invention the core 47 is formed of a plurality of strands, such as copper tinsel conductor strands. A sheath formed of rubber provides a very flexible and weatherproof insulator for the conductor core but it is important that the conductor be kept clean and free of deposits to condition any portion thereof for soldering. For this and other reasons it is not considered advisable to place the rubber sheath directly upon the copper core. In order to provide a barrier for the rubber sheath which will not decrease the flexibility of the entire assembly, but which will add greatly to the tensile strength and life thereof, the knitted coverings 63 and 64 are formed between the core and the sheath, in opposite directions relative to the general axis of the core. These knitted coverings serve not only as a positive barrier for the sheath but permit free bending and twisting of the assembly without possibility of the strands of the core projecting therethrough and coming in contact with the rubber sheath. It will be observed that the loops of one covering extend spirally in the direction of the twisting of the strands, which compose the core, while the loops of the other covering extend in a different direction. Therefore, if the assembly should be twisted in one direction one cover would be tightened about the core while there would be a tendency to loosen the other cover. It is, therefore, apparent that by twisting the assembly in either direction in an attempt to loosen one of the covers the other cover would be tightened about the core, preventing any of the strands from projecting therethrough.

In the preferred form of the invention as illustrated in the drawing the needle carrier 23 and its needles 39 are rotated while the cams 60 and 61 are held stationary. As a result thereof the courses of the knitted coverings extend longitudinally of the core 47, while the wales formed by the interconnected loops of successive threads extend spirally about the core. As another embodiment of the invention, the needle carrier of each unit may be held stationary and the cams rotated to cause actuation of the cam levers and needles. The result of this embodiment of the invention would be the forming of knitted coverings on the core wherein the wales would extend longitudinally of the core while the courses thereof would extend spirally about the core. It is not believed necessary to illustrate in detail how the needle carriers may be held stationary and cams rotated. This arrangement may be made possible by fixing the tubular needle carrier support 17 against rotation and conditioning the bearing member 20 and the integral portion of the housing 12, up to and including the portion thereof supporting the cams, for rotation in a suitable bearing and mounting the bevelled gear 16 upon the portion 20 instead of the support 17. With this arrangement the needle carrier for each unit would be held stationary and the cams rotated.

The apparatus comprises means for advancing a core, such as copper conductor strands, means for knitting covers thereon in different directions to serve as a barrier for a sheath such as soft rubber, and means to extrude a sheath of plastic material, such as rubber, thereon.

The method is practised by the aid of the apparatus and specifically comprises the advancement of a conductor formed of copper or other non-ferrous metal, knitting a covering thereon in one direction, knitting another covering thereon in a different direction relative to the direction of the first covering and the general axis of the core, and applying a sheath on the second covering of a suitable plastic material such as soft rubber.

Although the knitting heads are defined as being positioned one above the other is should be understood that they may be disposed in any desired position. For example, they may lie horizontally with their axes in alignment with the vulcanizing chamber 70.

The embodiments of the invention herein disclosed are illustrative only and may be widely modified and departed from in many ways without departing from the spirit and scope of the invention as pointed out in and limited only by the appended claims.

What is claimed is:

1. A method of forming an electrical conductor comprising knitting a covering on an electrical conductor core with the wales of the covering extending spirally about the core in one direction, and knitting a second covering on the first covering with the wales of the second covering extending spirally about the core in a different direction.

2. A method of forming an electrical conductor comprising knitting a covering on an electrical conductor core with the wales of the covering extending spirally about the core in one direction, and knitting a second covering on the first covering with the wales of the second covering extending spirally about the core in a different direction, each covering being formed of interconnected loops to be closed over the core when the core is twisted to loosen the loops of the other covering.

3. A method of forming an electrical conductor comprising knitting a covering on an electrical conductor core with the wales of the covering extending spirally about the core in one direction, knitting a second covering on the first covering with the wales of the second covering extending spirally about the core in a different direction, and forming a sheath of plastic material over the covered core and completely separated from the core by the coverings.

4. A method of forming an electrical conductor comprising knitting a covering on an electrical conductor core with the wales of the covering extending spirally about the core in one direction, knitting a second covering on the first covering with the wales of the second covering extending spirally about the core in a different direction, each covering being formed of interconnected loops to be closed over the core when the core is twisted to loosen the loops of the other covering, and forming a sheath of plastic material over the covered core and completely separated from the core by the coverings.

5. In an apparatus for forming electrical conductors, means for advancing an electrical conductor core, a knitting head operable in one direction to knit a covering on the core with wales of the covering extending spirally about the core in one direction, and a second knitting head spaced from the first knitting head and operable in another direction to knit a covering on the first covering with wales of the second covering extending spirally about the core in a direction differing from that of the wales of the first covering.

6. In an apparatus for forming electrical conductors, means for advancing an electrical conductor core, a knitting head operable in one direction to knit a covering on the core with wales of the covering extending spirally about the core in one direction, and a second knitting head spaced from the first knitting head and operable in another direction to knit a covering on the first covering with wales of the second covering extending spirally about the core in a direction differing from that of the wales of the first covering, each covering being formed of interconnected loops to be closed over the core when the core is twisted to loosen the loops of the other covering.

BEN K. FORD.